United States Patent
Todd et al.

(10) Patent No.: US 10,240,800 B2
(45) Date of Patent: Mar. 26, 2019

(54) COOKTOP APPLIANCE AND GRIDDLE ASSEMBLY

(71) Applicant: Haier US Appliance Solutions, Inc., Wilmington, DE (US)

(72) Inventors: Justin Patrick Todd, Louisville, KY (US); Rebekah Leigh Tyler, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 146 days.

(21) Appl. No.: 15/442,763

(22) Filed: Feb. 27, 2017

(65) Prior Publication Data

US 2018/0245798 A1 Aug. 30, 2018

(51) Int. Cl.
| | |
|---|---|
| *F24C 3/00* | (2006.01) |
| *F24C 15/18* | (2006.01) |
| *H05B 3/68* | (2006.01) |
| *A47J 37/00* | (2006.01) |
| *A47J 36/00* | (2006.01) |

(52) U.S. Cl.
CPC ............. *F24C 15/18* (2013.01); *A47J 36/00* (2013.01); *A47J 37/00* (2013.01); *H05B 3/68* (2013.01)

(58) Field of Classification Search
USPC ............................................. 126/214 C, 39 J
See application file for complete search history.

(56) References Cited

U.S. PATENT DOCUMENTS

| | | | |
|---|---|---|---|
| 2,533,383 A * | 12/1950 | Marfield | F24C 15/10 126/214 C |
| 3,344,735 A | 10/1967 | Kochman | |
| 3,747,509 A | 7/1973 | Hinkle | |
| 4,580,550 A * | 4/1986 | Kristen | F24C 3/067 126/39 H |
| 7,766,005 B2 * | 8/2010 | Lee | F23D 14/145 126/15 A |
| 8,074,563 B2 | 12/2011 | Bowles et al. | |
| 2008/0149092 A1 * | 6/2008 | Lee | F24C 3/047 126/39 J |
| 2011/0067577 A1 | 3/2011 | Riddle et al. | |

* cited by examiner

*Primary Examiner* — Avinash Savani
(74) *Attorney, Agent, or Firm* — Dority & Manning, P.A.

(57) ABSTRACT

A cooktop appliance and griddle assembly are generally provided herein. The cooktop appliance may include a top panel, a heating element attached to the top panel, an upper plate, and a lower plate. The upper plate may be disposed above the top panel along a vertical direction. An upper plate may have a top cooking surface and a bottom heating surface. The top cooking surface may extend perpendicular to the vertical direction to receive a cooking item thereon. The bottom heating surface may be positioned beneath the upper plate and face the top panel to receive a thermal output from the heating element. The lower plate may extend perpendicular to the vertical direction beneath a portion of the upper plate and above the top panel. A radiation channel may be defined between the lower plate and the bottom heating surface along the vertical direction.

17 Claims, 4 Drawing Sheets

COOKTOP APPLIANCE AND GRIDDLE ASSEMBLY

FIELD OF THE INVENTION

The present subject matter relates generally to cooking appliances, and more particularly to cooktop appliances and griddle assemblies therefor.

BACKGROUND OF THE INVENTION

Cooking appliances, e.g., cooktops or ranges (also known as hobs or stoves), generally include one or more heated portions for heating or cooking food items within or on a cooking utensil placed on the heated portion. For instance, each heated portion may be provided as burners, resistive heating elements, inductive heating elements, or radiant heaters may be included with each heated portion. The heated portions utilize one or more heating sources to output heat, which is transferred to the cooking utensil and thereby to any food item or items that are positioned on or within the cooking utensil. For instance, a griddle may be provided to extend across one or more heated portion. When positioned above the heated portion, the griddle generally provides a substantially flat cooking surface.

Although a griddle may provide a flat cooking surface, difficulties may arise in dispersing or spreading heat across the flat cooking surface. Generally, heat from the heated portions of the appliance is directly transferred or conducted to the griddle according to the footprint of the heated portion. Heat may be localized according to the general shape of the heated portion. In other words, heat may be uneven across various portions of the flat cooktop surface. This may result in only a limited portion of the flat cooking surface being heated, or being heated to a significantly higher temperature than the rest of the flat cooking surface (i.e., creating "hot spots"). For instance, in systems including round heated portions, a round "hot spot" may be formed on the flat cooking surface during use. If the griddle extends over multiple burners, such hot spots may be increasingly problematic and cause food items thereon to be cooked unevenly.

Some existing systems have tried to address difficulties temperature distribution by forming the griddle with an increased thickness or mass to slow conduction of heat from the bottom of the griddle to the flat cooktop surface. Other existing systems have added, for instance, vertical fins that extend along the bottom portion of the griddle to vary heat conduction from a heated portion to the flat cooktop surface.

However, further improvements are necessary to improve cooking performance. It would be advantageous to provide a cooktop appliance that supplies even heating across a cooking surface. Specifically, it would be advantageous to provide a griddle assembly that evenly distributes heat across a predetermined cooking surface.

BRIEF DESCRIPTION OF THE INVENTION

Aspects and advantages of the invention will be set forth in part in the following description, or may be obvious from the description, or may be learned through practice of the invention.

In one aspect of the present disclosure, a cooktop appliance is provided. The cooktop appliance may include a top panel, a heating element attached to the top panel, an upper plate, and a lower plate. The upper plate may be disposed above the top panel along a vertical direction. An upper plate may have a top cooking surface and a bottom heating surface. The top cooking surface may extend perpendicular to the vertical direction to receive a cooking item thereon. The bottom heating surface may be positioned beneath the upper plate and face the top panel to receive a thermal output from the heating element. The lower plate may extend perpendicular to the vertical direction beneath a portion of the upper plate and above the top panel. A radiation channel may be defined between the lower plate and the bottom heating surface along the vertical direction.

In another aspect of the present disclosure, a griddle assembly for a cooktop appliance is provided. The griddle assembly may include an upper plate and a lower plate. The upper plate may have a top cooking surface and a bottom heating surface. The top cooking surface may extend perpendicular to a vertical direction to receive a cooking item. The bottom heating surface may face away from the top cooking surface to receive a thermal output. The lower plate may be disposed beneath a portion the upper plate along the vertical direction. A radiation channel may be defined between the lower plate and the bottom heating surface along the vertical direction to receive a radiated heat from the lower plate.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
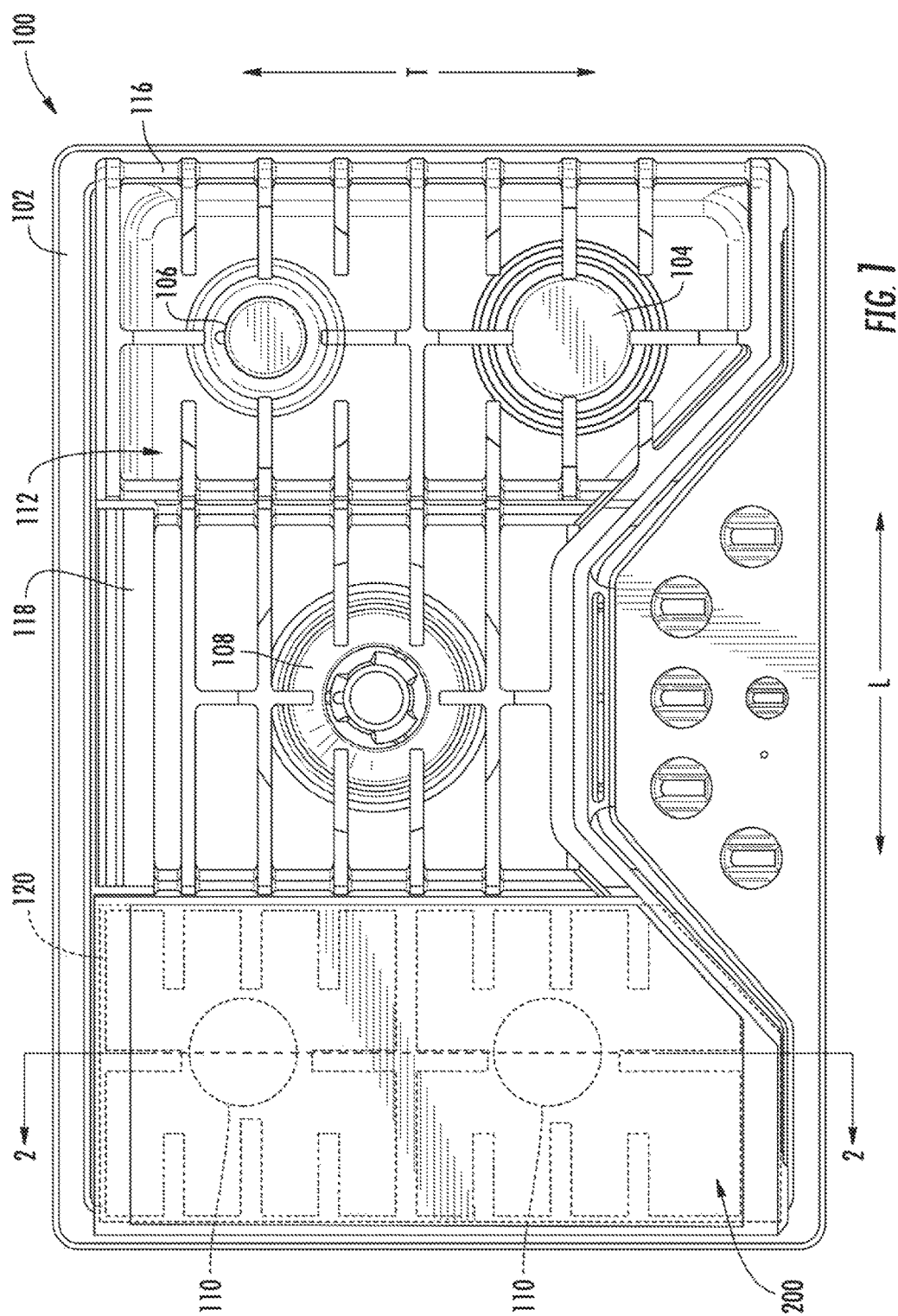
FIG. 1 provides a top view of a cooktop appliance according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally the present disclosure provides a cooktop appliance and/or griddle assembly that include an upper plate and a lower plate that may be placed above a heating element. The upper plate may define a cooking surface while the lower plate extends beneath the upper plate. During use of the griddle assembly, the lower plate may be vertically separated from the upper plate. The vertical separation may be defined as a radiation channel between the two plates.

Figure 2:
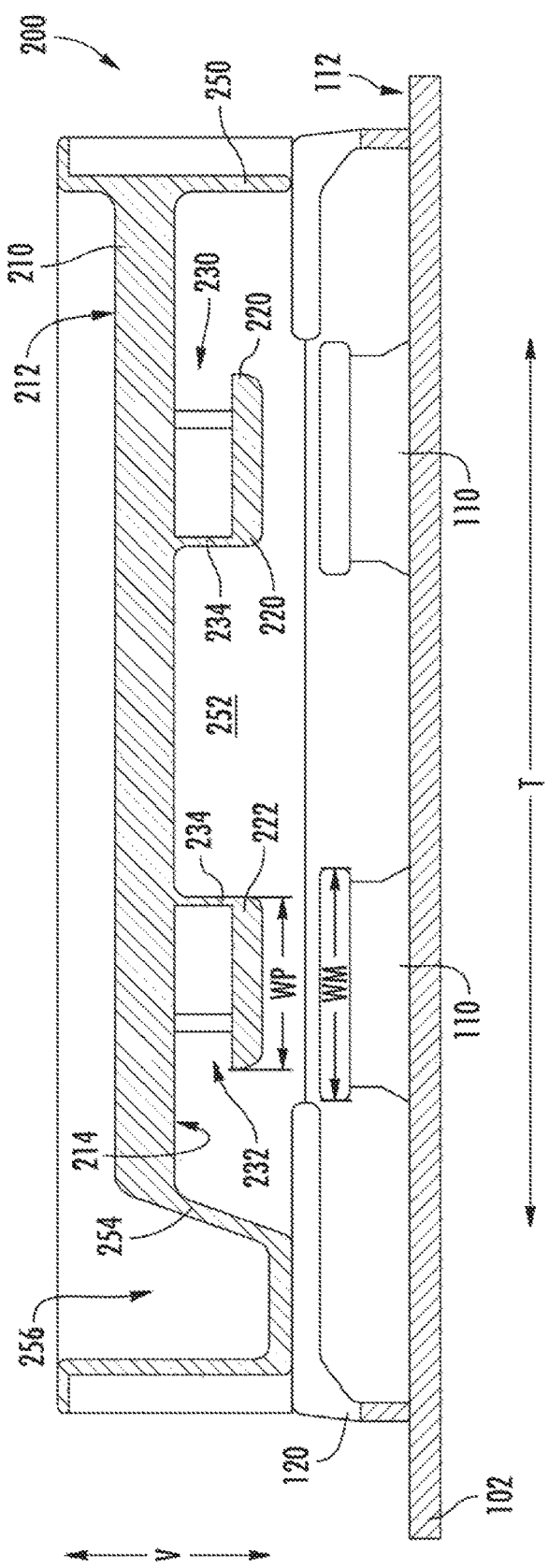
FIG. 2 provides a cross-sectional side view of the example cooktop appliance of FIG. 1 along the line 2-2.

Turning now to the figures, FIG. 1 provides a top view of a cooktop appliance 100 having a griddle assembly 200. FIG. 2 provides a cross-sectional side view of cooktop appliance 100 along the line 2-2 shown in FIG. 1. Generally, cooktop appliance 100 defines a vertical direction V, a lateral direction L, and a transverse direction T. Each of the vertical direction V, lateral direction L, and transverse direction T may be mutually orthogonal to each other.

Cooktop appliance 100 generally includes one or more heating elements, e.g., heating elements 104, 106, 108, 110. Although FIGS. 1 and 2 show heating elements 104, 106, 108, 110 as being gas burners, other embodiments may include radiant heating elements, induction heating elements, resistive heating elements, or other suitable heating elements. When assembled, cooktop appliance 100 may be installed at any suitable location. For example, cooktop appliance 100 may be mounted to a countertop and used as a standalone cooktop appliance in certain embodiments. In other example embodiments, cooktop appliance 100 may be utilized in a range appliance. In addition, while described in greater detail below in the context of cooktop appliance 100, it should be understood that the present subject matter may be used in any other suitable cooktop appliance in alternative exemplary embodiments. Thus, cooktop appliance 100 is provided by way of example only and is not intended to limit the present subject matter to any particular arrangement or configuration.

As may be seen in FIGS. 1 and 2, cooktop appliance 100 includes top panel 102 with an outer surface 112. Top panel 102 may be constructed of or with any suitable material. For example, top panel 102 may be constructed of or with enameled steel or ceramic. Top panel 102 may also have any suitable shape. For example, top panel 102 may be rectangular or square, e.g., in a plane that is perpendicular to the vertical direction V.

A plurality of heating elements 104, 106, 108, 110 (e.g., as a plurality of gas burners) is attached to top panel 102. For instance, one or more of heating elements 104, 106, 108, 110 may be mounted to top panel 102 and positioned at outer surface 112 of top panel 102. Each heating element of heating elements 104, 106, 108, 110 may have any suitable shape and size, and a combination of variously sized and/or shaped heating elements may be provided in order to facilitate heating of a variety of cooking utensils. For example, in embodiments such as that shown in FIG. 1, the plurality of heating elements include a large ring element 104, a small ring element 106 defining a burner diameter smaller than the large ring element 104, a variable-ring element 108, and/or multiple medium ring elements that each define a burner diameter smaller than the large ring element 104 and larger than the small ring element 106.

A plurality of grates 116, 118, 120 is also positioned on top panel 102 at outer surface 112 of top panel 102. Specifically, grates 104, 106, 108, 110 may be positioned over heating elements 104, 106, 108, 110. Grates 116, 118, 120 are generally configured for supporting cooking utensils, such as pots, pans, etc., over heating elements 104, 106, 108, 110, and heating elements 104, 106, 108, 110 are configured for heating utensils thereon, e.g., by combusting gaseous fuel and air. As shown in FIG. 1, grates may include a first grate 116 (or pair of grates), second grate 118, and third grate 120 positioned on top panel 102. When assembled, first grate 116 is positioned over a large ring element 104 and small ring element 106, second grate 118 is positioned over variable-ring element 108, and third grate 120 is positioned over medium elements 110. Grates 116, 118, 120 are removable from top panel 102. For example, a user of cooktop appliance 100 may lift grates 116, 118, 120 upwardly to remove grates 116, 118, 120 from top panel 102.

In some embodiments, cooktop appliance 100 also includes a griddle assembly 200. Griddle assembly 200 is generally removable from top panel 102. For instance, during use, griddle assembly 200 may rest on grate 120. Alternatively, griddle assembly 200 may rest directly on top panel 102, e.g., such that grate 120 and griddle assembly 200 may are interchangeable on top panel 102.

Generally, griddle assembly 200 defines a vertical direction, a lateral direction, and a transverse direction. The vertical direction, lateral direction, and transverse direction defined by griddle assembly 200 are all mutually perpendicular and form a secondary orthogonal direction system. When griddle assembly 200 is disposed on top panel 102, the secondary orthogonal system may be considered perpendicular to the orthogonal system, including vertical direction V, later direction L, and transverse direction T. Thus, although the orientation of griddle assembly 200 may vary with respect to the rest of cooktop appliance 100, griddle assembly 200 will be described as positioned during use and with respect to vertical direction V, lateral direction L, and transverse direction T.

Griddle assembly 200 includes an upper plate 210 that may be positioned over top panel 102, e.g., along the vertical direction V. Upper plate 210 defines a top cooking surface 212 and a bottom heating surface 214 below and beneath top cooking surface 212. In example embodiments, upper plate 210 is a generally planar member. In turn, top cooking surface 212 may be a substantially flat surface. Moreover, one or both of top cooking surface 212 and bottom heating surface 214 may extend perpendicular to the vertical direction V. Upper plate 210 may have any suitable shape. For example, upper plate 210 may be substantially rectangular or square, e.g., in a plane that is perpendicular to the vertical direction V.

As shown, griddle assembly 200 may be selectively positioned above one or more of the heating elements 104, 106, 108, 110. For instance, griddle assembly 200 may be placed on third grate 120, above heating elements 110. During use, top cooking surface 212 faces away from top panel 102 to receive a cooking item thereon. By contrast, bottom heating surface 214 may be opposite from top cooking surface 212 and faces top panel 102 during use. Thus, bottom heating surface 214 may face top panel 102 to receive a thermal output, e.g., flame or heated air, from heating element 110.

One or more lower plates 220, 222 are provided on griddle assembly 200 beneath upper plate 210. Each lower plate 220, 222 may be provided as a solid generally planar member, e.g., extending perpendicular to the vertical direction V. A first lower plate 220 extends beneath at least a portion of bottom heating surface 214. At least a portion of upper plate 210 is spaced apart from first lower plate 220, e.g., along the vertical direction V. Thus, a first radiation channel 230 may be defined along the vertical direction V between lower plate 220 and bottom heating surface 214 of upper plate 210. In optional embodiments, first radiation channel 230 has a constant vertical thickness along the span of lower plate 220, as illustrated in FIG. 2. During use, first lower plate 220 may be positioned between upper plate 210 and top panel 102, e.g., at a heating element 110.

As shown, a second lower plate 222 may extend beneath another portion of bottom heating surface 214. Second lower plate 222 may be provided as a solid generally planar member, e.g., extending perpendicular to the vertical direction V. At least a portion of upper plate 210 is spaced apart from second lower plate 222, e.g., along the vertical direction V. Thus, a second radiation channel 232 may be defined along the vertical direction V between lower plate 222 and bottom heating surface 214 of upper plate 210. In optional embodiments, second radiation channel 232 has a constant vertical thickness along the span of lower plate 222, as illustrated in FIG. 2. During use, second lower plate 222 may be positioned between upper plate 210 and top panel 102, e.g., at a heating element 110.

In further embodiments, second lower plate 222 and second radiation channel 232 are laterally aligned, e.g., positioned within the same plane, as the corresponding first lower plate 220 and second radiation channel 230. In alternative embodiments, however, second lower plate 222 and first lower plate 220 may be offset along the vertical direction V. In other words, the lower plates 220, 222 may be configured such that one of first lower plate 220 and second lower plate 222 is positioned within a different lateral plane from the other of first lower plate 220 and second lower plate 222.

When assembled, each lower plate 220, 222 is fixed relative to upper plate 210. Optionally, upper plate 210 may be formed integrally (i.e., as a monolithic unitary member) with lower plates 220, 222 and/or another portion of griddle assembly 200. For instance, griddle assembly 200, including upper plate 210 and lower plates 220, 222, may be integrally formed from a suitable conductive metal (e.g., cast iron, aluminum, etc.).

In example embodiments, such as those illustrated in FIG. 2, one or more discrete members may attach lower plates 220, 222 to upper plate 210. The discrete members may be vertical plate struts 234. Each vertical plate strut 234 may extend from the bottom heating face of upper plate 210 to a lower plate 220 or 222. Vertical plate struts 234 may thus hold lower plates 220, 222 at a set position relative to upper plate 210.

As noted above, during use, at least a portion of griddle assembly 200 may be positioned over top panel 102 and one or more of heating elements 110. Specifically, at least one heating element 110 may be vertically aligned beneath one lower plate. For instance, first lower plate 220 may be positioned directly above one heating element 110. Additionally or alternatively, second lower plate 222 may be positioned directly above another heating element 110.

Figure 3:
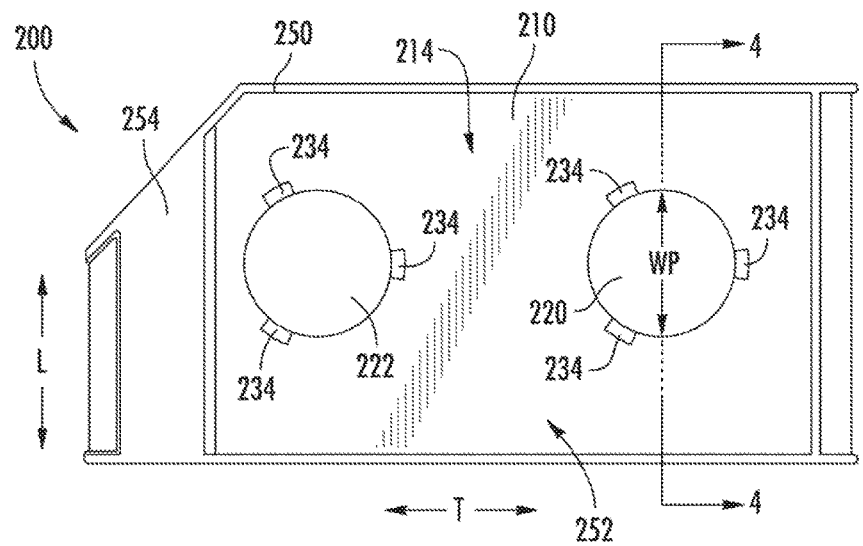
FIG. 3 provides a bottom view of the griddle assembly of the example cooktop appliance of FIG. 1.
Figure 4:
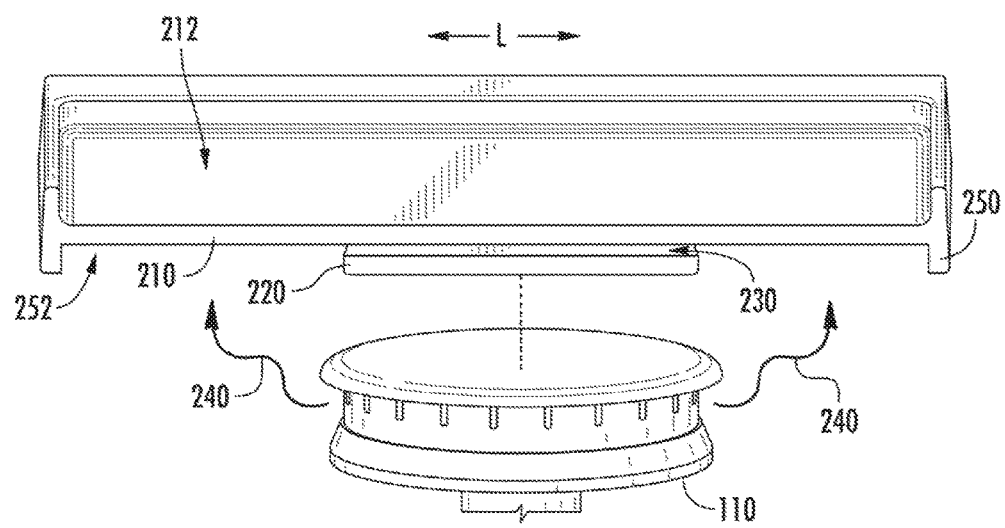
FIG. 4 provides a cross-sectional front perspective view of the example griddle assembly of FIG. 3 along the line 4-4 and above a heating element.

Turning now to FIGS. 2 through 4, various views are provided of a griddle assembly 200 according to example embodiments of the present disclosure. As shown, lower plates 220, 222 may be provided as disc-shaped members, e.g., having a circular or other suitably-shape profile when viewed from below. Heating elements 110 may have a corresponding (e.g., circular) profile. During use, each heating element 110 may be coaxially, as well as vertically, aligned with a corresponding lower plate 220 or 222.

In certain embodiments, each heating element 110 has a predefined element width WM perpendicular to the vertical direction V, e.g., in the transverse direction T or the lateral direction L. One or more of lower plates 220, 222 has a similar predefined plate width WP, e.g., in the transverse direction T or the lateral direction L. In optional embodiments, the element width WM is greater than the plate width WP. Thus, heating element 110 may extend radially outward (i.e., perpendicular to the vertical direction V) beyond lower plate 220 or 222. In alternative embodiments, the element width WM is less than the plate width WP. In optional embodiments, such as the embodiments, such as those illustrated in FIGS. 2 through 4, element width WM and plate width WP may be defined as diameters (i.e., circular widths) for heating elements 110 and lower plates 220, 222, respectively.

Although FIGS. 2 and 3 show lower plates 220, 222 as having an identical shape (including an identical plate width WP), it is understood that alternative embodiments may include lower plates that have non-identical sizes and/or shapes. For instance, one lower plate that is positioned above a relatively large heating element may have a plate width that is greater than the plate width of a lower plate that is positioned above a relatively small heating element. Optionally, the size and shape of each lower plate may be generally tuned to correspond with the size and shape of a specific heating element.

During use, lower plates 220, 222 and radiation channels 230, 232 at least partially restrict heat generated or output from a corresponding burner. Specifically, lower plates 220, 222 and radiation channels 230, 232 act as thermal breaks to conducted heat and/or natural convection currents rising from heating elements 110. As illustrated in FIG. 4, the thermal output or heat generated at a heating element 110 (e.g., flames and/or heated air indicated at arrows 240), may be directed about a lower plate 220 and diffused to the surrounding bottom heating surface 214 of lower plate 220. As lower plate 220 is heated directly by thermal output 240, lower plate 220 may indirectly radiate heat to the portion of bottom heating surface 214 directly above lower plate 220 (i.e., the portion of bottom heating surface 214 to which lower plate 200 is vertically aligned beneath). Lower plates 220, 222 and radiation channels 230, 232 may thus limit or restrict heat being transferred to the upper plate 210. Advantageously, upper plate 210 may be evenly heated to provide a consistent temperature distribution, e.g., at top cooking surface 212.

In some embodiments, a perimeter rim 250 extends downward along the vertical direction V from upper plate 210. In specific embodiments, perimeter rim 250 may define the footprint on which griddle assembly 200 is supported. For instance, perimeter rim 250 may extend to a position below lower plates 220, 222, e.g., as a vertical extreme of griddle assembly 200. Perimeter rim 250 may be positioned along an outer portion of griddle assembly 200. Moreover, perimeter rim 250 may extend continuously about one or more of lower plates 220, 222, as illustrated in FIG. 3. Optionally, perimeter rim 250 may be integrally assembled or formed with upper plate 210 or griddle assembly 200 in general.

When assembled, perimeter rim 250 may define an exhaust cavity 252 beneath upper plate 230. In some such embodiments, exhaust cavity 252 is open to heating element 110 and vertically bounded by the bottom heating surface 214. Exhaust cavity 252 may include an unimpeded open space around lower plates and radiation channels 230, 232. For instance, exhaust cavity 252 may include an open interior space, e.g., in the transverse direction T, separating first lower plate 220 from second lower plate 222. During use, at least a portion of the thermal output 240 generated at heating element 110 may be contained or confined within exhaust cavity 252, thereby diffusing heat across upper plate 210.

In optional embodiments, griddle assembly 200 includes a recessed segment, e.g., trough 254, that extends below upper plate 210, e.g., from top cooking surface 212. For instance, trough 254 may be positioned along an outer portion of griddle assembly 200 and away from heating elements 110. Moreover, trough 254 may define a collection cavity 256 to hold or collect byproducts from cooking operations performed on top cooking surface 212. Optionally, a bottom portion of trough 254, e.g., opposite of collection cavity 256 may be formed as part of perimeter rim 250 and define at least a portion of exhaust cavity 252. Thus, trough 254 may be contiguous with the remaining portion of perimeter rim 250.

Figure 5:
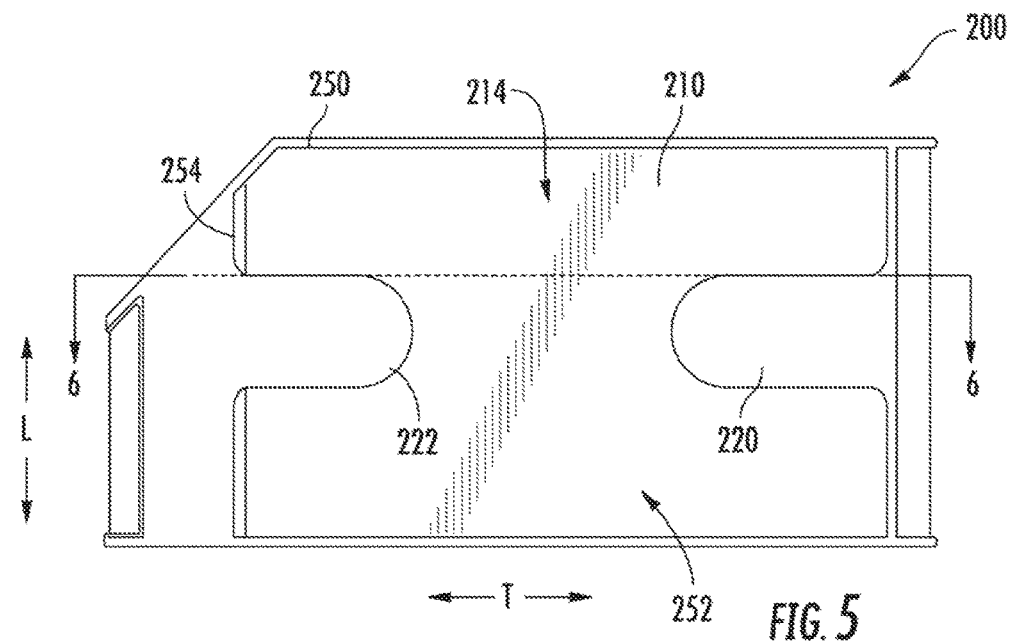
FIG. 5 provides a bottom view a griddle assembly according to other example embodiments of the present disclosure.
Figure 6:
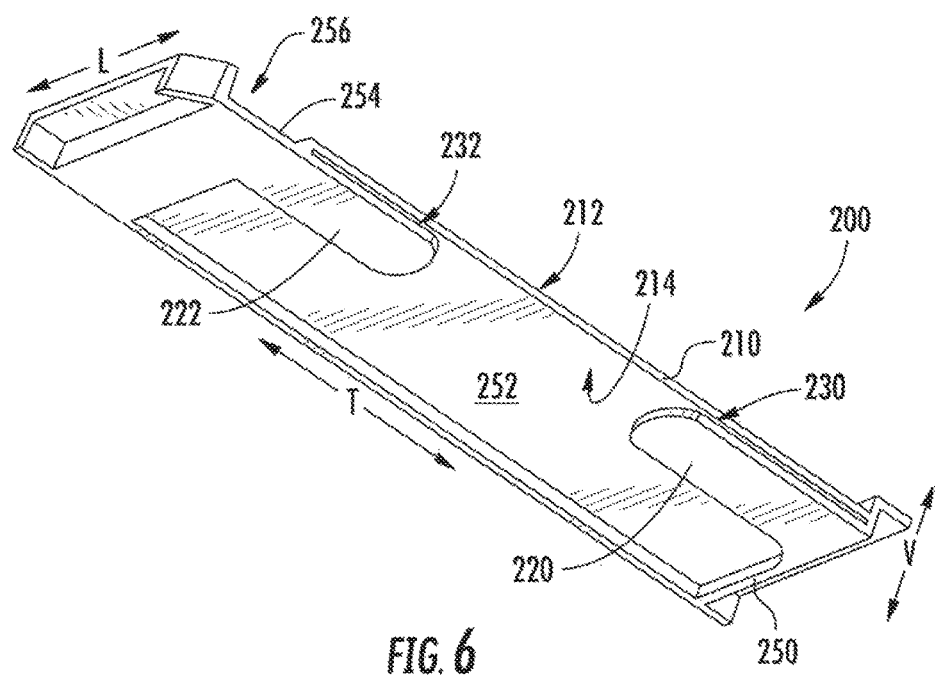
FIG. 6 provides a cross-sectional bottom perspective view of the example griddle assembly of FIG. 5 along the line 6-6.

Turning now to FIGS. 5 and 6, another griddle assembly 200 according to alternative embodiments of the present disclosure, is illustrated. Except as otherwise indicated, the griddle assembly 200 is understood to be similar to the embodiments illustrated in FIGS. 2 through 4. Thus, griddle assembly 200 may include some or all of the features of the above-described embodiments.

As shown in FIGS. 5 and 6, example embodiments of griddle assembly 200 include two lower plates 220, 222 extending beneath upper plate 210. Upper plate 210 may be parallel to one or both of lower plates 220, 222. For instance, lower plates 220, 222 may be perpendicular to the vertical direction V. Specifically, one or both of lower plates 220, 222 may extend from perimeter rim 250, e.g., as cantilevered plates. Thus, in some such embodiments, no additional features or struts are required to secure lower plates 220, 222 at a fixed position beneath upper plate 210. Radiation channels 230, 232 extend in the vertical direction V between lower plates 220, 222 and upper plate 210. Moreover, radiation channels 230, 232 extend in the transverse direction T from perimeter rim 250 to an open interior portion of exhaust cavity 252. The lateral edges of radiation channels 230, 232 are generally open and in fluid communication with the rest of exhaust cavity 252. Similarly, a transverse extreme of each radiation channel 230, 232 may be, optionally, open and in fluid communication with the rest of exhaust cavity 252.

As described above, lower plates 220, 222 may extend over heating elements 110 (FIG. 1). At least a portion of each lower plate 220, 222 is vertically aligned with a corresponding heating element 110. During use, each heating element 110 is thus beneath a corresponding one of lower plates 220, 222. In some embodiments, the plate width WP is a lateral width. Plate width WP, of each lower plate 220, 222 may be substantially constant along the transverse direction T. Additionally or alternatively, a semi-circular segment may be formed on an interior edge of each lower plate 220, 222, e.g., coaxial with a corresponding heating element 110. As described above, in some embodiments, plate width WP is less than element width WM (FIG. 2). In other embodiments, plate width WP is greater than element width WM.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooktop appliance defining a vertical direction, the cooktop appliance comprising:
   a top panel;
   a heating element attached to the top panel;
   an upper plate selectively disposed above the top panel along the vertical direction, the upper plate having a top cooking surface and a bottom heating surface, the top cooking surface extending perpendicular to the vertical direction to receive a cooking item thereon, the bottom heating surface positioned beneath the upper plate and facing the top panel to receive a thermal output from the heating element;
   a lower plate fixed to the upper plate and extending perpendicular to the vertical direction beneath a portion of the upper plate and above the top panel, a radiation channel being defined between the lower plate and the bottom heating surface along the vertical direction; and
   a perimeter rim extending in the vertical direction from the upper plate to a position below the lower plate, the perimeter rim defining an exhaust cavity above the heating element, wherein the exhaust cavity is in fluid communication with the radiation channel and the heating element.

2. The cooktop appliance of claim 1, wherein the heating element is vertically aligned beneath the lower plate.

3. The cooktop appliance of claim 2, wherein the heating element has a predefined element width, wherein the lower plate has a predefined plate width, and wherein the element width is greater than the plate width.

4. The cooktop appliance of claim 2, wherein the heating element has a predefined element width, wherein the lower plate has a predefined plate width, and wherein the element width is less than the plate width.

5. The cooktop appliance of claim 1, wherein the lower plate is a first lower plate and the radiation channel is a first radiation channel, and wherein the oven appliance further comprises a discrete second lower plate extending perpendicular to the vertical direction beneath another portion of the upper plate above the top panel, a discrete radiation channel being defined between the lower plate and the bottom heating surface along the vertical direction.

6. The cooktop appliance of claim 5, wherein the heating element is a first heating element, the first heating element being vertically aligned beneath the first lower plate, and wherein the cooktop appliance further comprises a second heating element attached to the top panel, the second heating element being vertically aligned beneath the second lower plate.

7. The cooktop appliance of claim 1, wherein the lower plate extends perpendicular to the vertical direction directly from the perimeter rim.

8. The cooktop appliance of claim 1, further comprising a vertical plate strut extending from the bottom heating surface to the lower plate, the vertical plate strut holding the lower plate at a set position relative to the upper plate.

9. The cooktop appliance of claim 1, wherein the lower plate is integrally-formed with the upper plate.

10. The cooktop appliance of claim 1, further comprising a grate supporting the upper plate and lower plate above the heating element.

11. The cooktop appliance of claim 10, wherein a portion of the grate is vertically aligned between the lower plate and the heating element.

12. A griddle assembly for a cooktop appliance, the griddle assembly comprising:

an upper plate having a top cooking surface and a bottom heating surface, the top cooking surface extending perpendicular to a vertical direction to receive a cooking item, the bottom heating surface facing away from the top cooking surface to receive a thermal output;

a lower plate fixed to the upper plate and disposed beneath a portion the upper plate along the vertical direction, a radiation channel being defined between the lower plate and the bottom heating surface along the vertical direction to receive a radiated heat from the lower plate; and a perimeter rim extending in the vertical direction from the upper plate to a position below the lower plate, the perimeter rim defining an exhaust cavity about the lower plate, wherein the exhaust cavity is in fluid communication with the radiation channel and a portion of the exhaust cavity beneath the lower plate.

13. The griddle assembly of claim 12, wherein the lower plate is a first lower plate and the radiation channel is a first radiation channel, and wherein the griddle assembly further comprises a discrete second lower plate extending perpendicular to the vertical direction beneath another portion of the upper plate, a discrete radiation channel being defined between the lower plate and the bottom heating surface along the vertical direction.

14. The griddle assembly of claim 12, wherein the lower plate extends perpendicular to the vertical direction directly from the perimeter rim.

15. The griddle assembly of claim 12, further comprising a vertical plate strut extending from the bottom heating surface to the lower plate, the vertical plate strut holding the lower plate at a set position relative to the upper plate.

16. The griddle assembly of claim 12, wherein the lower plate is integrally-formed with the upper plate.

17. The griddle assembly of claim 12, further comprising a grate supporting the upper plate and lower plate at a position below the lower plate.

\* \* \* \* \*